United States Patent
Wang et al.

(10) Patent No.: US 12,438,924 B2
(45) Date of Patent: Oct. 7, 2025

(54) METHOD, ELECTRONIC DEVICE, AND COMPUTER PROGRAM PRODUCT FOR SESSION SWITCHING

(71) Applicant: Dell Products L.P., Round Rock, TX (US)

(72) Inventors: Zijia Wang, Weifang (CN); Jiacheng Ni, Shanghai (CN); Jinpeng Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 18/136,626

(22) Filed: Apr. 19, 2023

(65) Prior Publication Data

US 2024/0323237 A1    Sep. 26, 2024

(30) Foreign Application Priority Data

Mar. 23, 2023    (CN) .......................... 202310295487.X

(51) Int. Cl.
*H04L 65/1069*    (2022.01)
*H04L 65/1083*    (2022.01)

(52) U.S. Cl.
CPC ...... *H04L 65/1069* (2013.01); *H04L 65/1083* (2013.01)

(58) Field of Classification Search
CPC .................. H04L 65/1069; H04L 65/1083
See application file for complete search history.

(56) References Cited

U.S. PATENT DOCUMENTS

| | | | | |
|---|---|---|---|---|
| 2020/0327191 A1* | 10/2020 | Lev-Tov | ............... | G06F 40/284 |
| 2023/0409616 A1* | 12/2023 | Bain | ................... | G06Q 30/015 |

OTHER PUBLICATIONS

A. Xu et al., "A New Chatbot for Customer Service on Social Media," Proceedings of the 2017 CHI Conference on Human Factors in Computing Systems, May 2017, pp. 3506-3510.
C. Liu et al., "Automatic Dialogue Summary Generation for Customer Service," Applied Data Science Track Paper, Aug. 2019, pp. 1957-1965.
I. Sutskever et al., "Sequence to Sequence Learning with Neural Networks," Proceedings of the 27th International Conference on Neural Information Processing Systems, vol. 2, Dec. 2014, pp. 3104-3112.

* cited by examiner

*Primary Examiner* — Bryan Y Lee
(74) *Attorney, Agent, or Firm* — Ryan, Mason & Lewis, LLP

(57) ABSTRACT

Embodiments of the present disclosure relate to a method, an electronic device, and a computer program product for session switching. The method includes: establishing a first session with a first terminal in response to a session request initiated by the first terminal. The method further includes: generating first response information to first request information from the first terminal. The method further includes: determining a first confidence level of the first response information; and determining, in response to the first confidence level being lower than a confidence level threshold, to switch the first session to a second session between the first terminal and a second terminal. The method for session switching according to embodiments of the present disclosure can provide a fast and satisfactory response to a request made by a user, thereby effectively satisfying the user requirements and significantly improving the user experience.

20 Claims, 7 Drawing Sheets

METHOD, ELECTRONIC DEVICE, AND COMPUTER PROGRAM PRODUCT FOR SESSION SWITCHING

RELATED APPLICATION

The present application claims priority to Chinese Patent Application No. 202310295487.X, filed Mar. 23, 2023, and entitled "Method, Electronic Device, and Computer Program Product for Session Switching," which is incorporated by reference herein in its entirety.

FIELD

Embodiments of the present disclosure relate to the field of computer processing, and more specifically, to a method, an electronic device, and a computer program product for session switching.

BACKGROUND

With the rapid development of smart terminals and artificial intelligence technologies, interactions between humans and machines have become increasingly mature. In one type of human-machine interaction application, a user can input voice, text, and other data, and a machine-attended terminal (hereinafter referred to as "machine terminal") can process the data input by the user and respond to the user's inquiries, requests, and so on, thus realizing human-machine conversations. Because machine terminals can be on duty around the clock and are highly responsive, this type of human-machine conversation has been widely used in a variety of industries, for example, to provide consulting services to users, and has shown a broad application prospect and great application potential.

SUMMARY

Embodiments of the present disclosure provide a method, an electronic device, and a computer program product for session switching.

According to a first aspect of the present disclosure, a method for session switching is provided. The method includes: establishing a first session with a first terminal in response to a session request initiated by the first terminal. The method further includes: generating first response information to first request information from the first terminal. The method further includes: determining a first confidence level of the first response information; and determining, in response to the first confidence level being lower than a confidence level threshold, to switch the first session to a second session between the first terminal and a second terminal.

According to a second aspect of the present disclosure, an electronic device is provided. The electronic device comprises at least one processor; and a memory coupled to the at least one processor and having instructions stored thereon, wherein the instructions, when executed by the at least one processor, cause the electronic device to perform actions comprising: establishing a first session with a first terminal in response to a session request initiated by the first terminal; generating first response information to first request information from the first terminal; determining a first confidence level of the first response information; and determining, in response to the first confidence level being lower than a confidence level threshold, to switch the first session to a second session between the first terminal and a second terminal.

According to a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of exemplary embodiments of the present disclosure, provided herein with reference to the accompanying drawings, the above and other objectives, features, and advantages of the present disclosure will become more apparent, wherein identical reference numerals generally represent identical components in the exemplary embodiments of the present disclosure.

In the accompanying drawings, identical or corresponding numerals represent identical or corresponding parts.

DETAILED DESCRIPTION

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a usual case, for simple inquiries and requests made by a user, a machine terminal can quickly provide a reply that is relatively satisfactory to the user. However, for some complex requests or requests that the machine terminal has not encountered before, the reply from the machine terminal may be provided slowly and may not be satisfactory to the user, or may even be contrary to the user requirements, thus seriously affecting the user's experience. Therefore, there is a need for a human-machine conversation system that can respond quickly to users' requests and improve the user experience.

Therefore, at least to solve the above problems and other potential problems, embodiments of the present disclosure provide a method for session switching. The method includes: establishing a first session with a first terminal in response to a session request initiated by the first terminal. The method further includes: generating first response information to first request information from the first terminal. The method further includes: determining a first confidence level of the first response information; and determining, in response to the first confidence level being lower than a confidence level threshold, to switch the first session to a second session between the first terminal and a second terminal. The method for session switching according to embodiments of the present disclosure can provide a fast and satisfactory response to a request made by a user, thereby effectively satisfying the user requirements and significantly improving the user experience.

Figure 1:
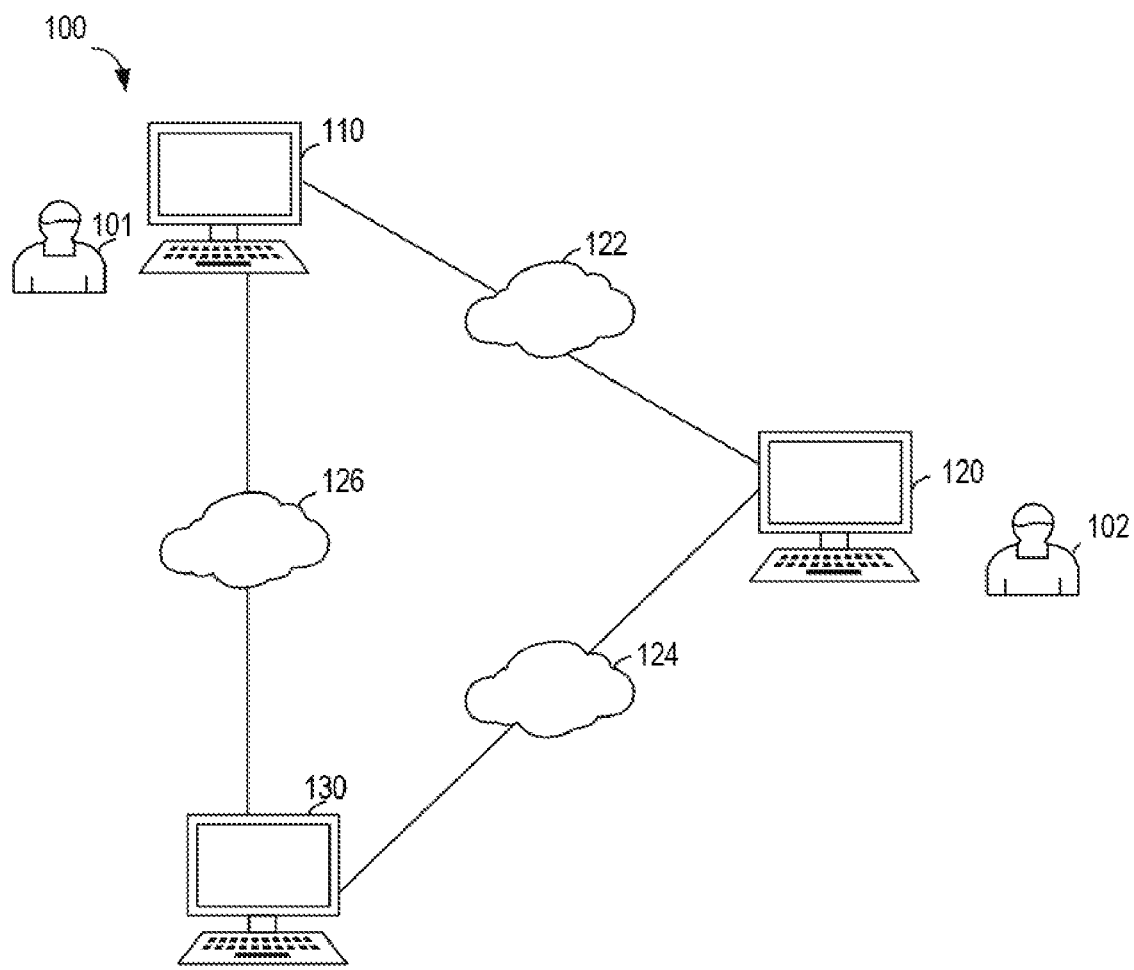
FIG. 1 illustrates a schematic diagram of an example system in which embodiments of the present disclosure can be implemented.

Embodiments of the present disclosure will be further described in detail below with reference to the accompanying drawings. FIG. 1 illustrates a schematic diagram of an example system 100 in which embodiments of the present disclosure can be implemented.

The example system 100 may include a first terminal 110, a second terminal 120, and a third terminal 130, and the first terminal 110 may be connected to the second terminal 120 via a network 122, the second terminal 120 may be connected to the third terminal 130 via a network 124, and the third terminal 130 may be connected to the first terminal 110 via a network 126. The first terminal 110 may be a user node. A user 101 may establish a session with the third terminal 130 through the first terminal 110, for example, to carry out a conversation, and so on. The third terminal 130 may be a non-human attended electronic device for responding to requests sent by the user 101 during the session.

In the event that the third terminal 130 needs to switch a session, for example, when the confidence level of response information generated by the third terminal 130 is lower than a confidence level threshold or when the third terminal 130 is turned off for some reason, the third terminal 130 may determine to switch the session with the first terminal 110 to a session between the second terminal 120 and the first terminal 110. In some embodiments, the second terminal 120 may be a session auxiliary device for the third terminal 130. In some embodiments, the second terminal 120 may be another non-human attended electronic device and can generate response information with a higher confidence level for one or more requests from the user 101 relative to the third terminal 130. In some other embodiments, the second terminal 120 may be a human attended terminal or electronic device (e.g., attended by a user 102, as illustrated in FIG. 1). Embodiments of the present disclosure are not limited as to whether the second terminal 120 is human attended.

When the session is switched to the session between the first terminal 110 and the second terminal 120, response information with a higher confidence level can be provided by the second terminal 120 to the request of the user 101, so that a fast and satisfactory response can be provided to the request made by the user, thereby effectively meeting the user requirements and significantly improving the user experience.

In addition, in order to improve the utilization of the system 100, the third terminal 130 can also respond to the request of the user 101 during the session between the first terminal 110 and the second terminal 120 (it can be understood that since the session between the third terminal 130 and the first terminal 110 does not exist, the response information is not sent to the first terminal 110 accordingly), and when the third terminal 130 determines that the confidence level of the generated response information is higher than the confidence level threshold, the third terminal 130 can be utilized to substitute the second terminal 120, and the session between the third terminal 130 and the first terminal 110 can be resumed. Further, the second terminal 120 is released for auxiliary use when session switching is required in this system or other systems.

Figure 2:
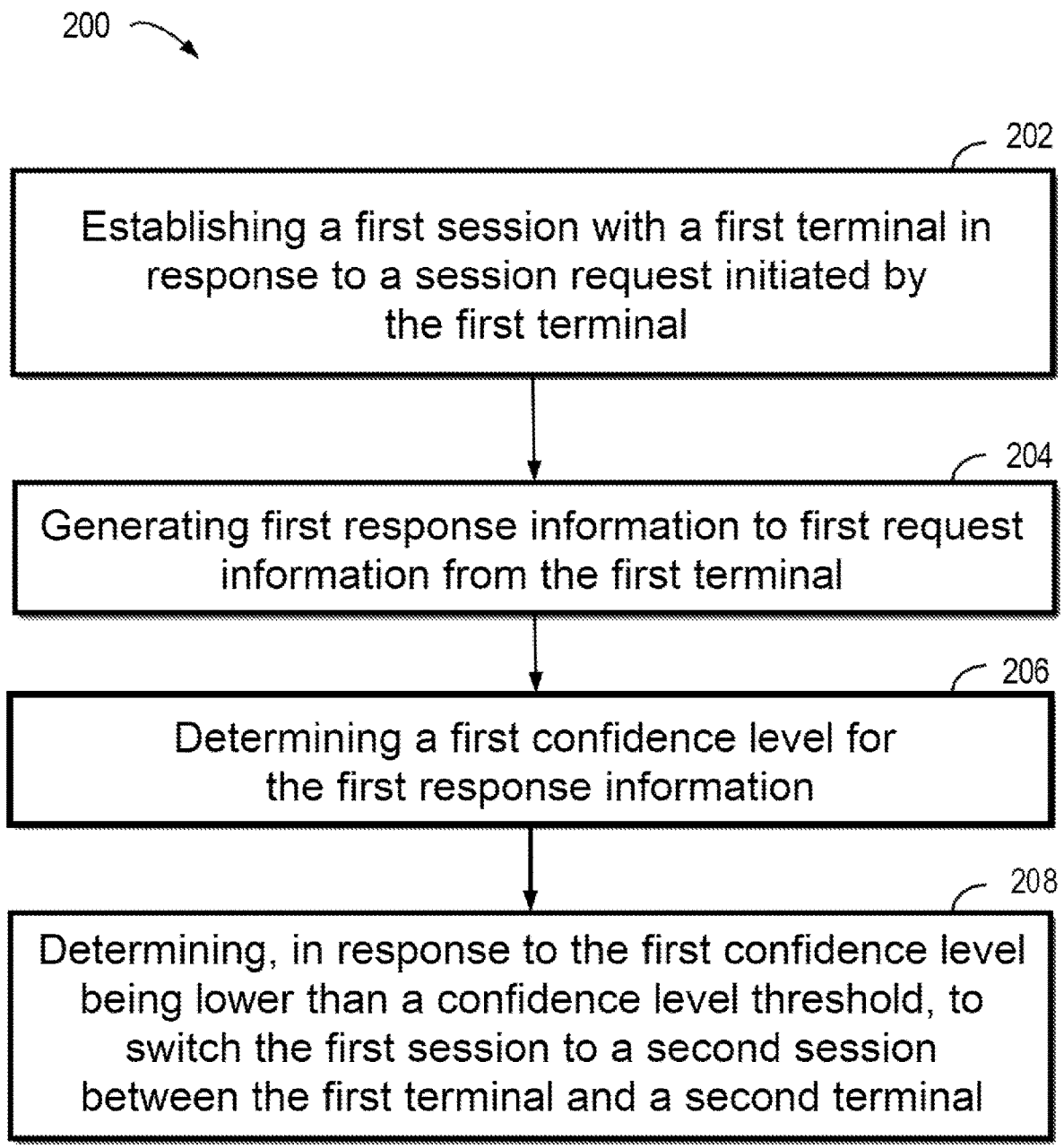
FIG. 2 illustrates a flow chart of a method for session switching according to an embodiment of the present disclosure.

A block diagram of the example system 100 in which embodiments of the present disclosure can be implemented has been described above with reference to FIG. 1. A flow chart of a method 200 for switching a session according to an embodiment of the present disclosure will be described below in connection with FIG. 2. The actions involved in the method 200 are described below in connection with the third terminal 130 in the system 100 as shown in FIG. 1. For example, in some embodiments, the method 200 may be performed by the third terminal 130. It should be understood that the method 200 may further include additional actions not shown and/or may omit actions shown, and the scope of the present disclosure is not limited in this aspect.

At block 202, the third terminal 130 may establish a first session with the first terminal 110 in response to a session request initiated by that first terminal 110. The user 101 of the first terminal 110 may send a session request for establishing a session to the third terminal 130 via the first terminal 110 and the network 126, for example, the user 101 may establish a session with the third terminal 130 by inputting text information at the first terminal 110.

At block 204, the third terminal 130 may generate first response information to first request information from the first terminal 110. In some embodiments, after the first session is established, the first terminal 110 may conduct a conversation with the third terminal 130. The user 101 of the first terminal 110 may send request information, for example, the first request information, to the third terminal 130 via the network 126. Accordingly, the third terminal 130 may respond to the request information and generate response information, for example, the first response information. It can be understood that the terms "first," "second," and "third" used herein are only intended to distinguish different information or terminals, and do not indicate an order of information generation or an order of devices, and the like.

At block 206, the third terminal 130 may determine a first confidence level of the first response information. In some embodiments, the third terminal may determine a confidence level of each token in the first response information and determine the first confidence level of the first response information based on the confidence level of each token.

For example, assuming that the first response information includes N tokens and the confidence level of each token may be expressed as $c_i$ (1≤i≤N), the confidence level of this first response information may be calculated by Equation (1) as follows:

$$C_{overall} = \frac{\sum_{i=1}^{N} c_i}{N} \quad \text{Equation (1)}$$

In addition, the confidence level of the first response information may also be calculated in other ways, and the present disclosure does not limit the way in which the confidence level of the response information is calculated.

At block 208, in response to the first confidence level calculated at block 206 being lower than a confidence level threshold, the third terminal 130 may determine to switch the first session to a second session between the first terminal 110 and the second terminal 120.

After the first confidence level is calculated in accordance with the calculation approach described above, the third terminal 130 may compare the calculated first confidence level with the confidence level threshold. By comparison, the third terminal 130 can determine the relationship between the first confidence level and the confidence level threshold, and determine, based on the relationship between the first confidence level and the confidence level threshold, whether to switch the session.

Specifically, when the first confidence level is higher than the confidence level threshold, which indicates that the response information generated by the third terminal 130 can meet the user requirements, the third terminal 130 can continue the session with the user 101 of the first terminal 110 so as to continue providing services to the user 101. When the first confidence level is lower than the confidence level threshold, which indicates that it is difficult for the response information generated by the third terminal 130 to meet the user requirements, the third terminal 130 determines that it needs to switch the first session to a second session between the first terminal 110 and the second terminal 120 so that the second terminal 120 provides services to the user 101.

In some embodiments, when determining to switch the first session to the second session between the first terminal 110 and the second terminal 120, the third terminal 130 may send buffer information to the first terminal 110. By reading the buffer information, the user may not feel the switching time for switching to the second session, so that the feeling of lag is avoided, thus improving the user experience of the user during the entire session. In some embodiments, the buffer information may include information related to the session.

The method for session switching according to embodiments of the present disclosure can provide a fast and satisfactory response to a request made by a user, thereby effectively satisfying the user requirements and significantly improving the user experience.

A method for switching a session according to an embodiment of the present disclosure has been described above in connection with FIG. 2. According to embodiments of the present disclosure, after switching the session to the second session, the session may also be switched back again to the session between the first terminal 110 and the third terminal 130 depending on the state of the third terminal 130, thereby releasing the second terminal 120 for use in assisting the session again when there is a need for it in this system or other systems.

Figure 3:
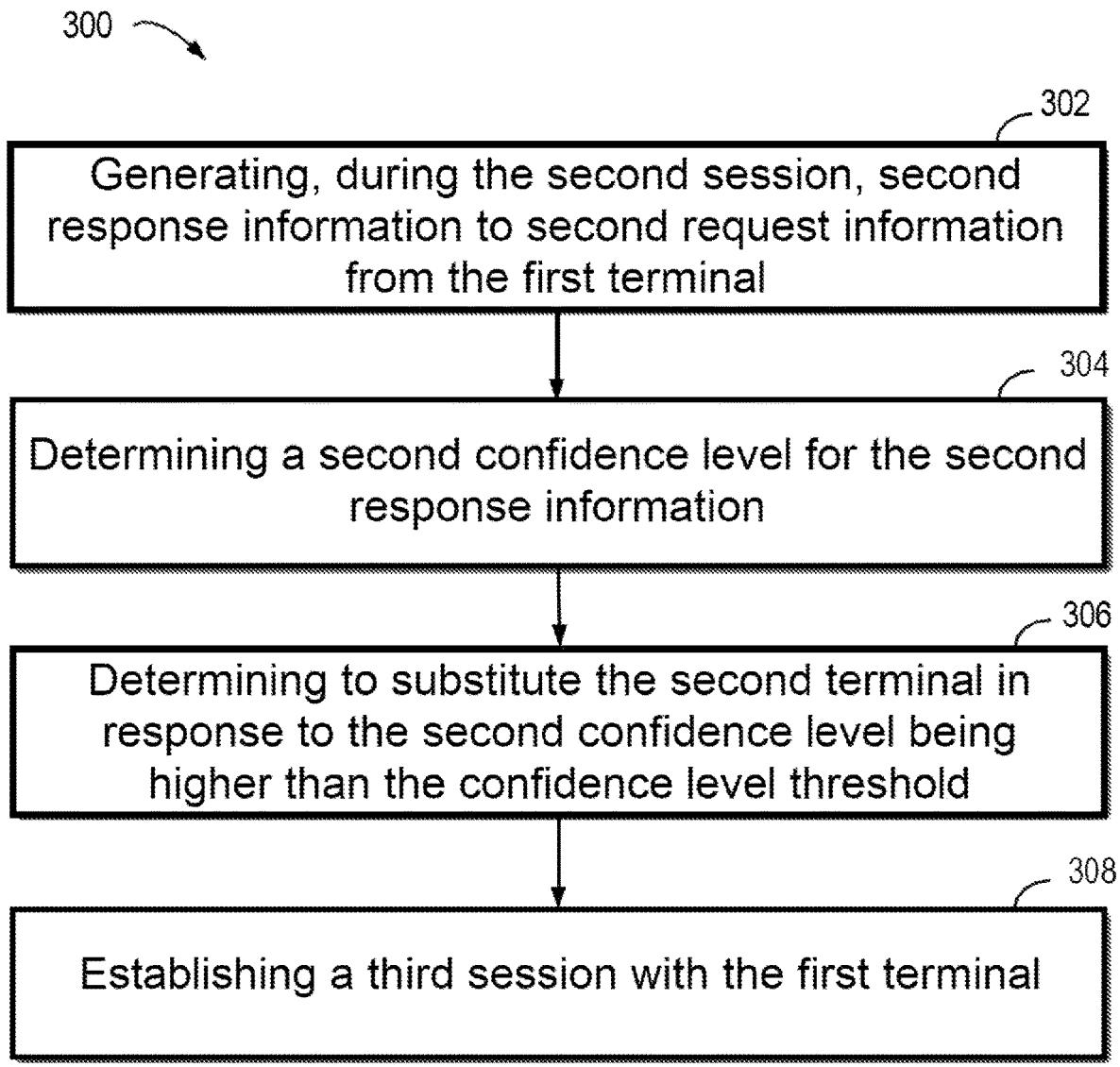
FIG. 3 illustrates a flow chart of a method for session switching according to another embodiment of the present disclosure.

Another method 300 for switching a session according to an embodiment of the present disclosure will be described below in connection with FIG. 3. The method 300 may be performed by the third terminal 130 following the execution of the method 200. It should be understood that the method 300 may further include additional actions not shown and/or may omit actions shown, and the scope of the present disclosure is not limited in this aspect.

At block 302, the third terminal 130 may generate, during the second session, second response information to second request information from the first terminal 110. The first terminal 110 may send the second request information to the second terminal 120 during the second session. The second terminal 120 may respond to this second request information and generate the corresponding response information. In addition, the second request information may also be sent to the third terminal 130, for example, sent by the second terminal 120 to the third terminal 130. The third terminal 130 may generate the second response information to the second request information. It can be understood that since the third terminal 130 does not establish a session with the first terminal 110 during the second session, and accordingly, the second response information is not sent to the first terminal 110.

At block 304, the third terminal 130 may determine a second confidence level of the second response information. In some embodiments, the third terminal 130 may use the approach described above to determine the second confidence level of the second response information.

At block 306, the third terminal 130 may determine to substitute the second terminal to participate in the session in response to the second confidence level being higher than the confidence level threshold. In some embodiments, the third terminal 130 may compare the calculated second confidence level with the confidence level threshold. By comparison, the third terminal 130 may determine the relationship between the second confidence level and the confidence level threshold and determine, based on the relationship between the second confidence level and the confidence level threshold, whether to substitute the second terminal 120 and switch the second session.

Specifically, when the second confidence level is higher than the confidence level threshold, which indicates that the second response information generated by the third terminal 130 has met the user requirements, the third terminal 130 may determine to substitute the second terminal 120 to switch back to the session with the user 101 of the first terminal 110, so as to resume providing services to the user 101. When the second confidence level is lower than the confidence level threshold, which indicates that it is still difficult for the response information generated by the third terminal 130 to meet the user requirements, the third terminal 130 determines to maintain the current second session, and the second terminal 120 provides services to the user 101, so as not to affect the user experience.

In some embodiments, in the process of determining whether to substitute the second terminal 120 to resume providing services to the first terminal 110, the third terminal 130 may send notification information that the second confidence level is higher than the confidence level threshold to the second terminal 120. Moreover, the second terminal 120 may confirm whether to exit the session. For example, the second terminal 120 may send a confirmation operation to the third terminal 130 to indicate a confirmation to exit the session, and the third terminal 130 substitutes the second terminal 120 to participate in the session. When the second terminal 120 determines that it is not appropriate to exit the session, the second terminal 120 may send a non-confirmation operation to the third terminal 130 to indicate that it is not to exit the conversation and maintains the second session with the first terminal 110.

At block 308, after determining to substitute the second terminal 120, the third terminal 130 may establish a third session with the first terminal 110 and resume services for the user 101. Thus, the resources of the second terminal 120 can be released for use to assist the session when required in this system or other systems and thus further enhance the user experience.

In some embodiments, during the second session, it may be difficult for the second terminal 120 to learn about the specific requirements of the user 101 because the second terminal 120 is involved only during the course of the session between the user 101 and the second terminal 120. Therefore, to enable the second terminal 120 to generate response information that better meets the user requirements, the second terminal can acquire auxiliary information to assist in generating the response information. In some embodiments, to the request information from the first terminal 110, the auxiliary information may include reference response information generated and sent by the third terminal 130 to the request information. In addition, the auxiliary information may also include historical information for the first session established between the first terminal 110 and the third terminal 130. By using the above auxiliary information, the second terminal 120 can learn about the requirements of the customer, and the second terminal 120 can generate response information that better meets the user requirements to the request information of the user 101 with reference to the reference response information generated by the third terminal 130.

Figure 4:
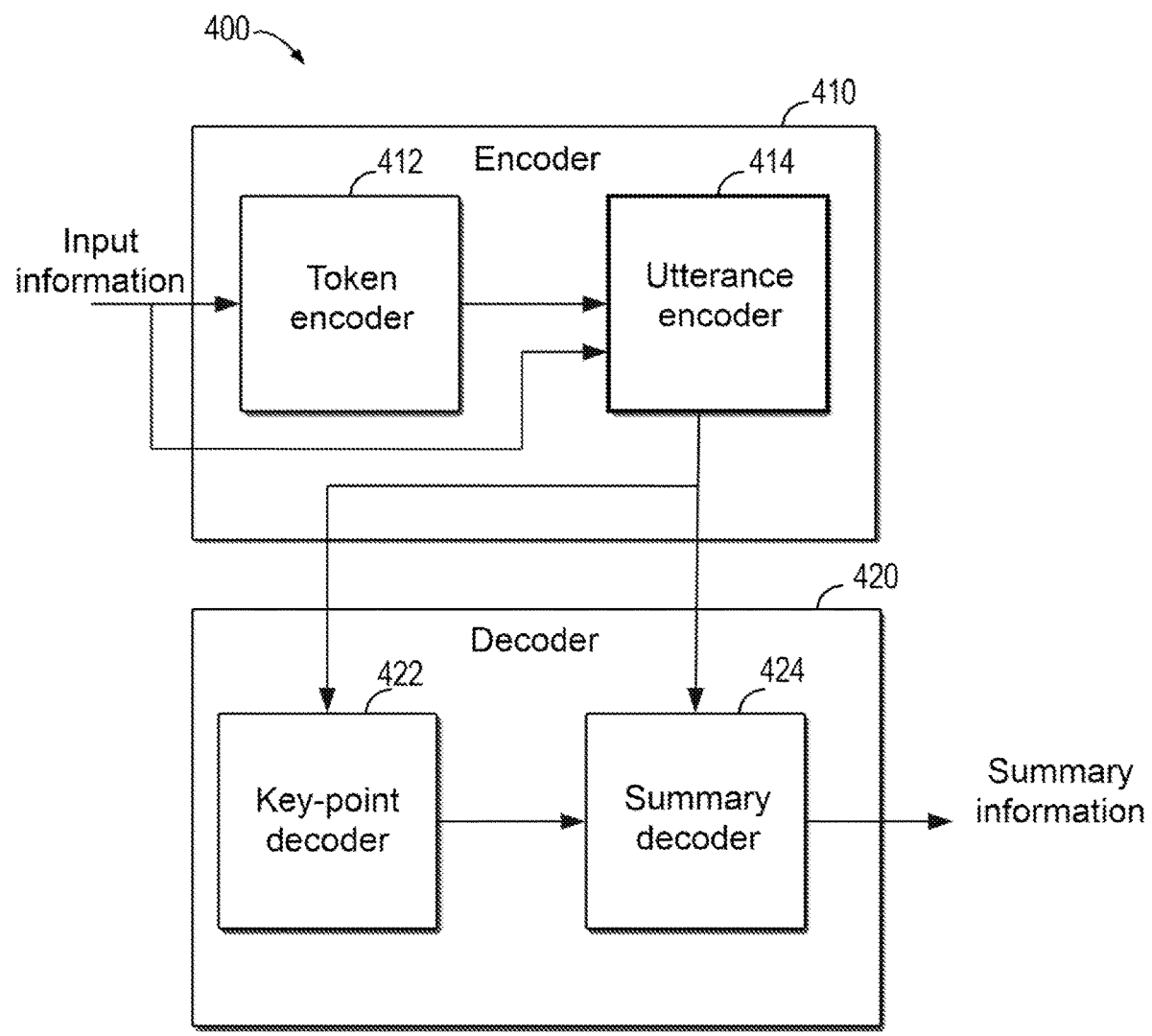
FIG. 4 illustrates a schematic diagram of a summary generation model according to an embodiment of the present disclosure.

In some embodiments, the summary information may be generated by a summary generation model based on the first response information generated in the first session (i.e., the first response information that triggers session switching and has a confidence level lower than the confidence level threshold) and on the historical information in the first session. FIG. 4 illustrates a schematic diagram of a summary generation model 400 according to an embodiment of the present disclosure.

As shown in FIG. 4, the summary generation model 400 may include an encoder 410 and a decoder 420, and the encoder 410 and decoder 420 may be implemented by various suitable neural network models. In some embodiments, the encoder 410 includes a token encoder 412 and an utterance encoder 414. The decoder 420 includes a key-point decoder 422 and a summary decoder 424.

In some embodiments, the token encoder 412 may receive input information (e.g., the first response information and the historical information in the first session) and encode the input information at the token level and generate first encoded information. The token encoder 412 inputs the first encoded information to the utterance encoder 414. The utterance encoder 414 receives the input information as well as the first encoded information from the token encoder 412 and encodes the received information at the utterance level to generate second encoded information. The utterance encoder 414 sends the second encoded information separately to the key-point decoder 422 and the summary decoder 424.

The key-point decoder 422 generates key-point information based on the received second encoded information and sends the key-point information to the summary decoder 424. The summary decoder 424 generates a summary, e.g., summary information for the first session, based on the received second encoded information and key-point information. The summary may be used by the second terminal 120 during the second session to generate response information to the request information of the user 101.

By using the summary information for the first session and referring to the reference response information generated by the third terminal 130, the second terminal 120 can generate response information that better meets the user requirements to the request information of the user 101, and the speed of generating the response information is also relatively faster.

In some embodiments, a plurality of second terminals 120 may exist in the system 100, and accordingly, in the process of switching the second session, the third terminal may select one second terminal 120 among the plurality of second terminals to establish the second session with the first terminal 110 to achieve session switching. In some embodiments, each terminal of the plurality of second terminals 120 may have a respective knowledge base (KB) value, and each KB value may correspond to a certain type of session. Having that KB value may indicate that the terminal is good at sessions of a type corresponding to that KB value. For example, in the case of a goods purchase inquiry, a KB value equal to 1 corresponds to an inquiry about product information; a KB value equal to 2 corresponds to an inquiry about logistics information; a KB value equal to 3 corresponds to after-sales maintenance information; and a KB value equal to 4 corresponds to return information, and the like. It can be understood that the above examples are only schematic, and a person skilled in the art can construct specific representations of KB values and corresponding types according to application scenarios and actual needs.

In some embodiments, in the case where there are a plurality of second terminals and each second terminal 120 has a corresponding KB value, and when the second terminal is selected for session switching, a switching parameter can be determined based on the first request information and the first response information, wherein this switching parameter may correspond to the KB value of the second terminal. In other words, the switching parameter may be associated with the second terminal and used to determine the second terminal for the second session. In some embodiments, the third terminal 130 can determine the switching parameter and select the second terminal for the second session. In some embodiments, computing terminals other than the third terminal 130 can also calculate the switching parameter and select the second terminal for the second session.

In some embodiments, feature extraction of the first request information and of the first response information may be performed by a switching parameter determination model, and the switching parameter may be determined based on the extracted features of the first request information and the extracted features of the first response information. In some embodiments, the switching parameter determination model includes a language representation model. For example, when the switching parameter determination model determines a value of 2 for the switching parameter based on the extracted features of the first request information and the extracted features of the first response information, a second terminal with a KB value of 2 may be selected for establishing the second session.

In some embodiments, in order to enable the third terminal 130 to continuously improve the confidence level of the generated response information and provide more satisfactory response information to the user, the third terminal 130 can be retrained multiple times. The sample information for retraining the third terminal 130 may include the response information generated by the second terminal 120 during the second session. For example, to the second request information sent by the user 101 during the second session, the second terminal 120 may generate the second response information. The second request information and the second response information may form a sample pair for use as a sample data set in the subsequent retraining process for the third terminal 130.

In some embodiments, since a large amount of paired sample information can be generated in the second session, a portion of the paired sample information can be selected based on preset conditions to train the third terminal 130, for example, a predetermined amount of paired sample information can be selected based on the average confidence level of the pairs of sample information and according to the order of the confidence level from highest to lowest to retrain the third terminal 130.

By retraining the third terminal with the updated paired sample information, the confidence level of the response information generated by the third terminal can be continuously improved, thus meeting the needs of customers and improving user experience and satisfaction.

Figure 5:
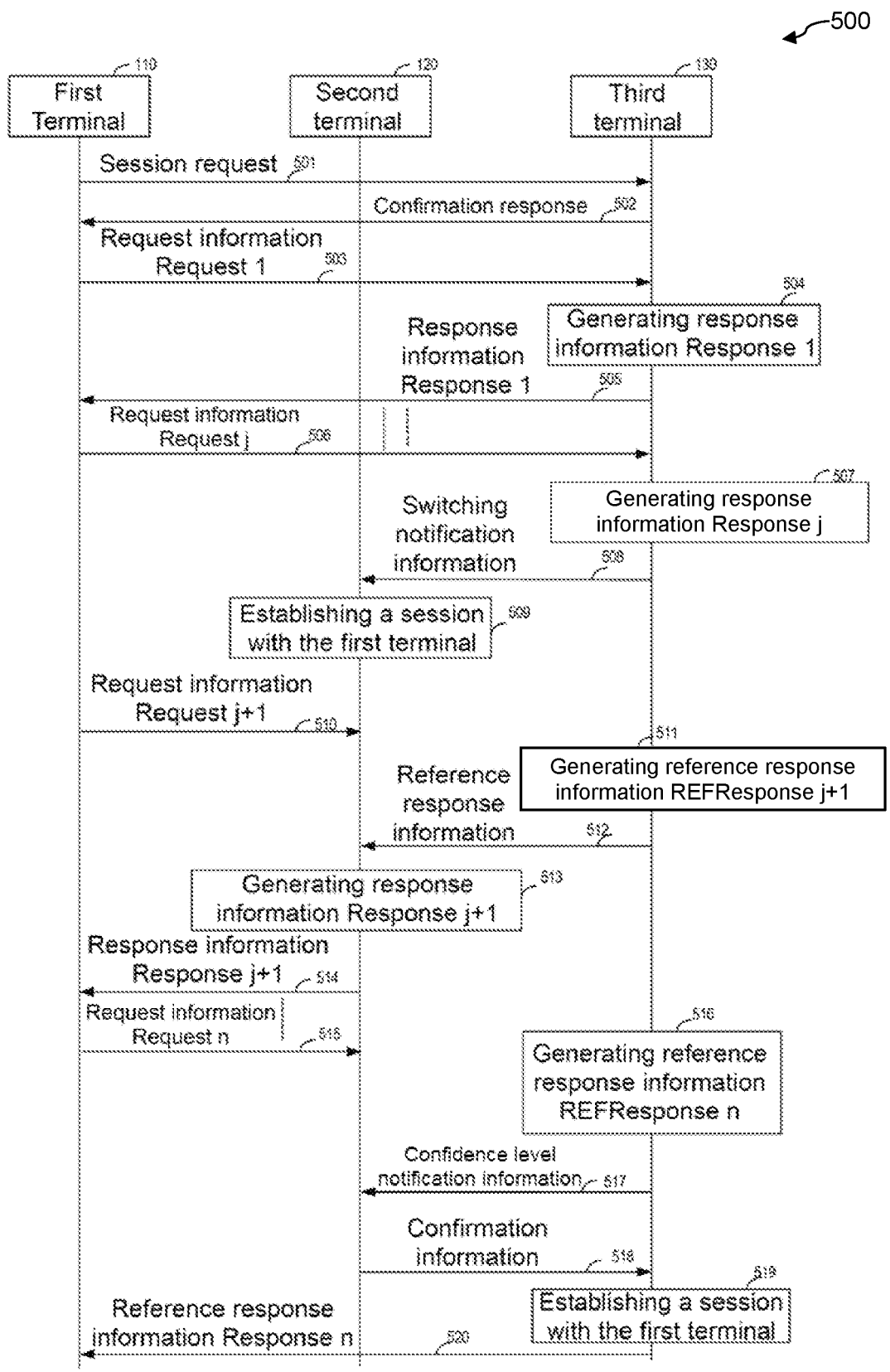
FIG. 5 illustrates a schematic process for session switching according to an embodiment of the present disclosure.

FIG. 5 illustrates a schematic process 500 for session switching according to an embodiment of the present disclosure. The process 500 in FIG. 5 is only schematic and is used for illustrative purposes. FIG. 5 will be described in connection with the first terminal 110, the second terminal 120, and the third terminal 130 in the system 100 of FIG. 1. In some embodiments, the first terminal 110 corresponds to the user 101, the third terminal 130 may include a non-human attended terminal, and the first terminal 110 may implement a human-machine conversation with the third terminal 130. The second terminal 120 is a session switching auxiliary terminal, and the second terminal 120 may include a human attended terminal for realizing the human customer service, and the second terminal 120 may also include a non-human attended terminal.

As shown in FIG. 5, the first terminal 110 sends a session request to the third terminal 130 at 501 for establishing a session with the third terminal 130. The session request may be initial information initially sent by the first terminal 110 to the third terminal 130, and may be various types of data such as voice data or text data for starting a session with the third terminal 130.

At 502, the third terminal 130 may establish a session with the first terminal 110 by generating and sending a confirmation response. The confirmation response may be response information for the session request. For example, in the case where the session request is the greeting language "Hello," the response information may also be reply information, for example, "Hello!" The present disclosure does not limit the format of the session request and the confirmation response.

After a session session/is established between the first terminal 110 and the third terminal 130, the first terminal 110 may send, at 503, request information, for example, Request 1, to the third terminal. For example, the request information may be a piece of information or other content consulted by the user 101. Accordingly, the third terminal 130 generates response information Response 1 at 504. Although not shown, the third terminal 130 may also determine a confidence level C1 of the response information Response 1 and compare the magnitude of the confidence level C1 of the response information Response 1 in relation to a confidence level threshold Cth. When the confidence level C1 of Response 1 is higher than the confidence level threshold Cth, the third terminal 130 may send the generated response information Response 1 to the first terminal 110, as shown at 505 in FIG. 5.

The session session/of the first terminal 110 with the third terminal 130 continues, and the first terminal 110 and the third terminal 130 may perform operations similar to those at 503-505 and conduct a session. At 506, the first terminal 110 may send request information, e.g., Request j, to the third terminal 130, for example, another piece of information or other content sent by the user 101. Accordingly, the third terminal 130 generates response information Response j at 507. Although not shown, the third terminal 130 may also determine a confidence level Cj of the response information Response j and compare the magnitude of the confidence level Cj of the response information Response j in relation to the confidence level threshold Cth. When it is determined that the confidence level Cj of Response j is lower than the confidence level threshold Cth, the third terminal 130 may determine to switch the session to a session between the first terminal 110 and the second terminal 120.

The third terminal 130 may send a switching notification to the second terminal 120 at 508, and in response to the switching notification, the second terminal 120 establishes a session session2 with the first terminal at 509 and continues a communication session with the user 101. The first terminal 110 may send the request information Request j+1 to the second terminal 120 at 510, and the second terminal 120 generates response information Response j+1.

In some embodiments, the third terminal 130 may generate reference response information REFResponse j+1 of the request information Request j+1 of the first terminal 110 at 511. On the one hand, the third terminal 130 may determine the confidence level of this reference response information REFResponse j+1; and on the other hand, the third terminal 130 may send this reference response information REFResponse j+1 to the second terminal 120, as shown at 512, for reference by this second terminal 120 when generating the response information Response j+1 at 513.

At 513, the second terminal 120 receives the reference response information REFResponse j+1 from the third terminal 130 and generates the response information Response j+1 based on the received summary information of the session session1. The summary information is generated in a manner that can be understood with reference to the description above and will not be repeated here. At 514, the second terminal 120 may send the response information Response j+1 to the first terminal 110.

The session session2 between the first terminal 110 and the second terminal 120 may continue as shown by the dashed lines in FIG. 5. At 515, the first terminal 110 may continue to send the request information Request n. In some embodiments, at 516, the third terminal 130 may generate reference response information REFResponse n to the request information Request n of the first terminal 110. On the one hand, the third terminal 130 may determine the confidence level of this reference response information REFResponse n; and on the other hand, the third terminal 130 may send this reference response information REFResponse n to the second terminal 120 for reference by this second terminal 120 when generating the response information Response n.

When it is determined that the confidence level of the response information REFResponse n is higher than the confidence level threshold, the third terminal 130 may determine that it can take over from the second terminal 120 to participate in the session. The third terminal 130 may send a notification that the confidence level of the response information REFResponse n is higher than the confidence level of the confidence level threshold to the second terminal 120 at 517, and the second terminal 120 confirms whether to exit the session and switch the session back to the third terminal 130. As shown in FIG. 5, when the second terminal 120 confirms to exit the session and the third terminal 130 substitutes the second terminal 120 to participate in the session, the second terminal 120 may send a confirmation operation to the third terminal at 518, and the third terminal 130 establishes a session session3 with the second terminal at 519 to provide services for the user 101. Moreover, the third terminal 130 may send the reference response information Response n to the first terminal 110 at 520.

In addition, although the third terminal 130 is shown in FIG. 5 to send the reference response information Response n to the first terminal 110 at 520, it can be understood that the response information Response n generated by the second terminal 120 to the request information Request n may also be sent by the second terminal 120 to the first terminal 110 before the session session3 is established in 519. After the session session3 is established, the third terminal 130 may continue to provide services to the user 101 until the user 101 terminates the session.

Figure 6:
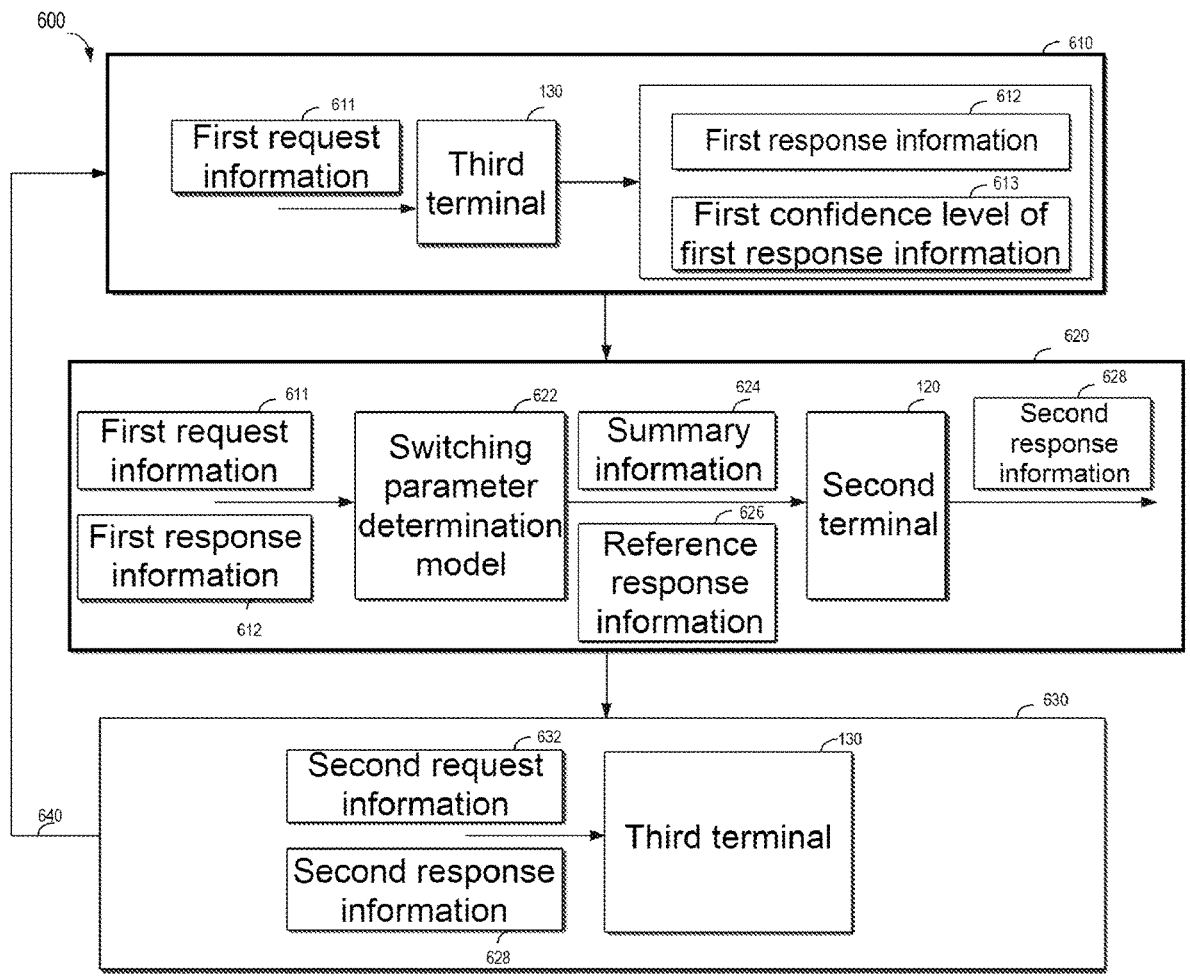
FIG. 6 illustrates an example block diagram of various stages of a session switching method according to an embodiment of the present disclosure.

FIG. 6 illustrates an example block diagram 600 of various stages of a session switching method according to an embodiment of the present disclosure. As described in FIG. 6, at block 610, the third terminal 130 establishes a first session with the first terminal 110, receives request information from the user 101 during the first session, and generates response information to the request information of the user 101. As shown in FIG. 6, the third terminal 130 may receive first request information 611, generate first response information 612, and determine a first confidence level 613 of the first response information 612. In response to the first confidence level 613 of the first response information 612 being lower than a confidence level threshold, the third terminal 130 determines to switch the first session with the first terminal 110 to a second session between the first terminal 110 and the second terminal 120.

As indicated in FIG. 6, the process proceeds to block 620, and at block 620, it switches to the second session between the second terminal 120 and the first terminal 110. In some embodiments, as previously described, the switching parameter may be determined by a switching parameter determination model 622 based on the first request information 611 and the first response information 612, wherein this switching parameter is associated with the second terminal. For example, the switching parameter may correspond to a KB value of the second terminal. The KB value can be determined based on the switching parameter, and thus the second terminal for the second session can be selected. In some embodiments, the switching parameter determination model 622 may be deployed at the third terminal 130, and the third terminal 130 may determine the switching parameter and select the second terminal for the second session. In some embodiments, the switching parameter determination model 622 may also be deployed at other terminals than the third terminal 130, and the second terminal for the second session may be selected by the other terminals. After the second terminal 120 is selected, the second session between the second terminal 120 and the first terminal 110 can be established. In the second session, the second terminal 120 may generate second response information 628 to the second request information sent by the user 101. In some embodiments, the second terminal 120 may receive summary information 624 for the first session and receive reference response information 626 generated by the third terminal 130 to the second request information so as to generate second response information 628. For the process of generating the summary information, reference can be made to relevant sections above, and for the sake of brevity, it will not be repeated here.

In addition, the second response information 628 generated by the second terminal 120 during the second session and second request information 632 sent by the user can be used as updated sample information for use in retraining the third terminal 130 at block 630. It can be understood that the samples for retraining may include a plurality of sample pairs generated during the second session. The retrained third terminal 130 can be used to generate response information to the request of the user, so that the second terminal is provided with more accurate reference response information, and also the user can be provided with more accurate response information when the session with the first terminal is resumed, as illustrated by an arrow 640 in FIG. 6.

Figure 7:
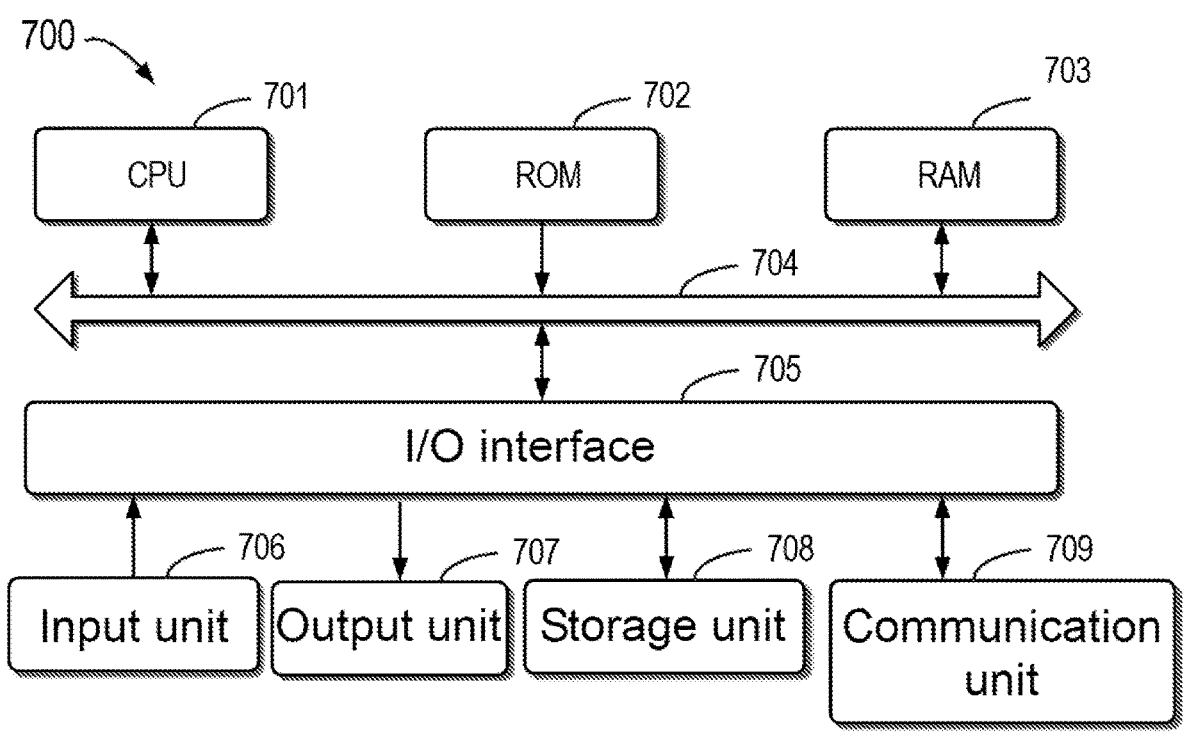
FIG. 7 shows a simplified block diagram of a device suitable for implementing the example embodiments of the present disclosure.

FIG. 7 illustrates a block diagram of an example device 700 which can be used to implement embodiments of the present disclosure. Any terminal in FIG. 1, including the third terminal 130, can be implemented using the device 700. As shown in the figure, the device 700 includes a central processing unit (CPU) 701 that can perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other via the bus 704. An Input/Output (I/O) interface 705 is also connected to the bus 704.

A plurality of components in device 700 are connected to the I/O interface 705, including: an input unit 706, such as a keyboard and a mouse; an output unit 707, such as various types of displays and speakers; a storage unit 708, such as a disk or an optical disk; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as the method 200 and method 300, may be performed by the CPU 701. For example, in some embodiments, the method 200 and the method 300 may be implemented as a computer software program that is tangibly included in a machine-readable medium, such as the storage unit 708. In some embodiments, part or all of the computer programs may be loaded and/or installed onto the device 700 via the ROM 702 and/or the communication unit 709. One or more actions of the methods 200 and 300 described above may be performed when the computer program is loaded into the RAM 703 and executed by the CPU 701.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of illustrative embodiments of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their technological improvements, so as to enable persons of ordinary skill in the art to understand the embodiments disclosed herein.

What is claimed is:

1. A session switching method, comprising:
   establishing a first session with a first terminal in response to a session request initiated by the first terminal;
   generating first response information to first request information from the first terminal;
   determining a first confidence level of the first response information;
   determining, in response to the first confidence level being lower than a confidence level threshold, to switch the first session to a second session between the first terminal and a second terminal;
   generating, during the second session, second response information to second request information from the first terminal;
   determining a second confidence level of the second response information;
   determining to substitute the second terminal in response to the second confidence level being higher than the confidence level threshold; and
   establishing a third session with the first terminal.

2. The method according to claim 1, wherein determining to substitute the second terminal comprises:
   sending notification information that the second confidence level is higher than the confidence level threshold to the second terminal; and
   determining to substitute the second terminal by receiving a confirmation operation of the second terminal for the notification information.

3. The method according to claim 1, further comprising:
   sending the second response information to the second terminal,
   wherein during the second session, the second terminal generates third response information to the second request information based on the second response information and on summary information for the first session.

4. The method according to claim 3, wherein the summary information is generated based on the first response information and on historical information in the first session.

5. The method according to claim 3, wherein the method is performed by a third terminal, and wherein the third terminal comprises a response information generation model, the method further comprising:
   receiving updated paired sample information, wherein the updated paired sample information comprises the second request information and the third response information; and
   retraining the response information generation model based on the updated paired sample information.

6. The method according to claim 1, wherein determining a first confidence level of the first response information comprises:
   determining a confidence level of each token in the first response information; and
   determining the first confidence level based on the confidence level of said each token.

7. The method according to claim 1, further comprising:
   determining the second terminal for the second session based on a switching parameter,
   wherein the switching parameter is determined based on the first request information and the first response information, and wherein the switching parameter is associated with the second terminal.

8. The method according to claim 7, wherein the switching parameter is determined by a switching parameter determination model based on features of the first request information and features of the first response information that are extracted.

9. The method according to claim 8, wherein the switching parameter determination model comprises a language representation model.

10. An electronic device, comprising:
    at least one processor; and
    memory coupled to the at least one processor and having instructions stored thereon, wherein the instructions, when executed by the at least one processor, cause the electronic device to perform actions comprising:
    establishing a first session with a first terminal in response to a session request initiated by the first terminal;
    generating first response information to first request information from the first terminal;
    determining a first confidence level of the first response information;
    determining, in response to the first confidence level being lower than a confidence level threshold, to switch the first session to a second session between the first terminal and a second terminal;
    generating, during the second session, second response information to second request information from the first terminal;
    determining a second confidence level of the second response information;
    determining to substitute the second terminal in response to the second confidence level being higher than the confidence level threshold; and
    establishing a third session with the first terminal.

11. The electronic device according to claim 10, wherein determining to substitute the second terminal comprises:
    sending notification information that the second confidence level is higher than the confidence level threshold to the second terminal; and
    determining to substitute the second terminal by receiving a confirmation operation of the second terminal for the notification information.

12. The electronic device according to claim 10, wherein the instructions, when executed by the at least one processor, further cause the electronic device to perform actions comprising:
    sending the second response information to the second terminal,
    wherein during the second session, the second terminal generates third response information to the second request information based on the second response information and on summary information for the first session.

13. The electronic device according to claim 12, wherein the summary information is generated based on the first response information and on historical information in the first session.

14. The electronic device according to claim 12, wherein the electronic device comprises a response information generation model, and wherein the instructions, when executed by the at least one processor, further cause the electronic device to perform actions comprising:
    receiving updated paired sample information, wherein the updated paired sample information comprises the second request information and the third response information; and
    retraining the response information generation model based on the updated paired sample information.

15. The electronic device according to claim 10, wherein determining a first confidence level of the first response information comprises:
- determining a confidence level of each token in the first response information; and
- determining the first confidence level based on the confidence level of said each token.

16. The electronic device according to claim 10, wherein the instructions, when executed by the at least one processor, further cause the electronic device to perform actions comprising:
- determining the second terminal for the second session based on a switching parameter,
- wherein the switching parameter is determined based on the first request information and the first response information, and wherein the switching parameter is associated with the second terminal.

17. The electronic device according to claim 16, wherein the switching parameter is determined by a switching parameter determination model based on features of the first request information and features of the first response information that are extracted.

18. A computer program product, the computer program product being tangibly stored on a non-transitory computer-readable medium and comprising machine-executable instructions, wherein the machine-executable instructions, when executed by a machine, cause the machine to:
- establish a first session with a first terminal in response to a session request initiated by the first terminal;
- generate first response information to first request information from the first terminal;
- determine a first confidence level of the first response information;
- determine, in response to the first confidence level being lower than a confidence level threshold, to switch the first session to a second session between the first terminal and a second terminal;
- generate, during the second session, second response information to second request information from the first terminal;
- determine a second confidence level of the second response information;
- determine to substitute the second terminal in response to the second confidence level being higher than the confidence level threshold; and
- establish a third session with the first terminal.

19. The computer program product according to claim 18, wherein the machine-executable instructions, when executed by the machine, further cause the machine to:
- determine the second terminal for the second session based on a switching parameter,
- wherein the switching parameter is determined based on the first request information and the first response information, and wherein the switching parameter is associated with the second terminal.

20. The computer program product according to claim 19, wherein the switching parameter is determined by a switching parameter determination model based on features of the first request information and features of the first response information that are extracted.

* * * * *